United States Patent
Yu et al.

(10) Patent No.: US 9,855,618 B2
(45) Date of Patent: Jan. 2, 2018

(54) FUNCTIONALIZED METAL OXIDE SOLDERING METHODS AND UV SENSOR MANUFACTURED THEREOF

(71) Applicant: Korea Advanced Institute of Science and Technology, Daejeon (KR)

(72) Inventors: Kyoungsik Yu, Daejeon (KR); Kyungmook Kwon, Daejeon (KR); Jaeho Shim, Daejeon (KR); Kyunghan Choi, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 169 days.

(21) Appl. No.: 14/623,155

(22) Filed: Feb. 16, 2015

(65) Prior Publication Data

US 2016/0158864 A1 Jun. 9, 2016

(30) Foreign Application Priority Data

Dec. 3, 2014 (KR) ........................ 10-2014-0172028

(51) Int. Cl.
*B05D 3/00* (2006.01)
*C08J 7/18* (2006.01)
(Continued)

(52) U.S. Cl.
CPC .............. *B23K 1/20* (2013.01); *B23K 1/0056* (2013.01); *C23C 18/1216* (2013.01); *C23C 18/14* (2013.01)

(58) Field of Classification Search
CPC ........... B23K 1/20; C23C 18/08; C23C 18/14; B82Y 40/00
See application file for complete search history.

(56) References Cited

U.S. PATENT DOCUMENTS

| 5,300,203 A * | 4/1994 | Smalley ................. B82Y 30/00 204/157.41 |
| 2011/0008245 A1* | 1/2011 | Park .................... B81C 1/00341 423/561.1 |

(Continued)

FOREIGN PATENT DOCUMENTS

KR 101340953 B1 12/2013

OTHER PUBLICATIONS

Shim et al; Hydrothermal Fabrication of Patterned ZnO Nanorod Clusters using Laser Direct Writing; 2012; pp. 190-191.*

(Continued)

*Primary Examiner* — Michael Wieczorek
(74) *Attorney, Agent, or Firm* — The Webb Law Firm

(57) ABSTRACT

Provided are a method of soldering a functionalized metal oxide, and an electronic device manufactured thereby, and more particularly, a method of soldering a functionalized metal oxide which is capable of growing a solder structure by a hydrothermal synthesis method using a pulsed laser, and is usable in a UV sensor, and an electronic device manufactured thereby. According to the present invention, thermal diffusion generated from a laser is limited due to the use of a pulsed laser, and thus, nanosolder having high density and a shape to be precisely adjustable may be prepared by a hydrothermal synthesis method by the pulsed laser, thereby facilitating the joining of the nanostructure, and further, the nanosolder is formed between the nanostructures, thereby being usable as a metal oxide structure having functionality.

10 Claims, 8 Drawing Sheets

(51) Int. Cl.
*G21H 5/00* (2006.01)
*B23K 1/20* (2006.01)
*C23C 18/14* (2006.01)
*B23K 1/005* (2006.01)
*C23C 18/12* (2006.01)

(56) References Cited

U.S. PATENT DOCUMENTS

2012/0305069 A1* 12/2012 Kim ................ B82Y 30/00
                                              136/256
2013/0260136 A1* 10/2013 Wu ................. B82Y 40/00
                                              428/323

OTHER PUBLICATIONS

Final Program of the Optical Society of Korea Summer Meeting, Aug. 26, 2014, pp. 26.
Nano Korea Poster Presentation Schedule, Jul. 2-4, 2014.
Kwon et al., "In-situ metal-oxides synthesis with pulsed laser heating", Korea Advanced Institute of Science and Technology, 2014.
"Additive Manufacturing and Application of Metal-Oxides with Pulsed Laser Heating", The Optical Society of Korea Summer Meeting, 2014, pp. 346-347.

* cited by examiner

FUNCTIONALIZED METAL OXIDE SOLDERING METHODS AND UV SENSOR MANUFACTURED THEREOF

CROSS-REFERENCE TO RELATED APPLICATION

This application claims priority to Korean Patent Application No. 10-2014-0172028 filed Dec. 3, 2014, the disclosure of which is hereby incorporated in its entirety by reference.

TECHNICAL FIELD

The following disclosure relates to a method of soldering a functionalized metal oxide, and an electronic device manufactured thereby. More particularly, the following disclosure relates to a method of soldering a functionalized metal oxide which is capable of growing a solder structure by hydrothermal synthesis method using a pulsed laser, and is usable in a UV sensor, and an electronic device manufactured thereby.

BACKGROUND

Oxide semiconductor technology has various advantages, as compared with the existing silicon (Si)-based device.

A first advantage in optical terms is that an oxide semiconductor may form a transparent thin film. The existing semiconductor such as a Si or GaAs semiconductor to be compared with the oxide semiconductor has a band gap of 1.2 eV and 1.43 eV, respectively, and when it is irradiated with visible light having energy above the band gap, it loses light energy by the phenomenon that electrons in a valence band are excited to a conduction band, which causes decrease of transmitted light energy. In comparison, since the oxide semiconductor such as ZnO, or $Ga_2O_3$, $In_2O_3$ or $SnO_2$ has a broad band gap of about 3.1 eV or more, it does not absorb, but transmits visible light, and thus, is usable as a transparent display device.

Secondly, in electrical and electronic terms, the oxide semiconductor has high carrier mobility (1-100 $cm^2$/Vs), and thus, also has an excellent electrical performance.

As a third advantage, the oxide semiconductor has polycrystalline and monocrystalline structures even at a room temperature, so that it is possible to manufacture a thin film transistor having good properties without a separate heat treatment (annealing) process.

Meanwhile, one-dimensional nanomaterials such as a nanorod, a nanowire, and the like refer to materials having a diameter of several nanometers to tens of nanometers, and a length of hundreds of nanometers to several micrometers. Such one-dimensional nanomaterials show various physical and chemical properties which have not been seen in the existing bulk materials, and using such properties, many applications as basic materials for the development of a nanodevice are expected.

The one-dimensional nanostructures using the metal oxide show excellent light transmittance, a high piezoelectric index, and a UV emitting property, and thus, it has been applied to various kinds of devices such as a transparent electrode of a UV-emitting diode or a laser diode, a photovoltaic device, an optical waveguide, and a gas sensor as base materials for implementing an electronic device, an optical device or a sensor in a nano size. Therefore, as the metal oxide nanostructure has an important role in manufacturing nanoscale devices, much attention is drawn to the synthesis method and the development of high-quality one-dimensional metal oxide nanostructures.

Representatives of the method of synthesizing the metal oxide nanostructure include a VLS (vapor-liquid-solid) method, a CBD (chemical-bath-deposition) method, and the like. The manufacturing process by the VLS method may relatively easily control the orientation of a zinc oxide nanostructure, but requires a growing condition such as a high vacuum condition and a high temperature, and has disadvantages such as difficulty in mass production, an expensive equipment price, much time required for the manufacture, and the like. Since the manufacturing process by the CBD method has various advantages of being simple, allowing synthesis at low temperature, and performing synthesis in a large area, many studies thereof have been made. Among them, a hydrothermal synthesis method which is the most representative method, is capable of growing the metal oxide nanostructure at relatively low temperature under a normal pressure, and thus, many studies thereof have been made.

Korean Patent No. 10-1340953 suggests a method of preparing a zinc oxide nanorod pattern in which hydrothermal synthesis occurs by supplying thermal energy for hydrothermal synthesis from laser irradiation, and at the same time, patterning is performed using a laser direct lithography apparatus, so that the process has excellent energy economics, and is feasible at a low cost within a short time; and patterns are prepared with a group of zinc oxide nanorods having desired size and density by controlling laser irradiation time, so that the method is easily usable in manufacturing a micro electronic apparatus, an optoelectronic device, an optical memory apparatus, a chemical sensor, a biosensor, and the like; and a zinc oxide nanorod pattern prepared thereby.

However, there are some problems that the laser of Korean Patent No. 10-1340953 uses a continuous laser, the nanostructure prepared by the method has low density, the shape of the nanostructure may not be precisely adjusted, and if the nanostructure is prepared using the continuous laser, it is not formed in a radial form as shown in FIG. 1, and thus, may not be used as a solder structure.

PRIOR ART DOCUMENT (Patent Document 1) Korean Patent No. 10-1340953

SUMMARY

An embodiment of the present invention is directed to providing a method of soldering a functionalized metal oxide allowing soldering between nanostructures, and an electronic device manufactured thereby.

Another embodiment of the present invention is directed to providing a method of soldering a functionalized metal oxide allowing the change of current with ultraviolet dosage, and an electronic device manufactured thereby.

Another embodiment of the present invention is directed to providing a method of soldering a functionalized metal oxide allowing the synthesis of a metal oxide film not in the existing wire form, but in a solder bump form having high density, through pulse width modulation, and an electronic device manufactured thereby.

In one general aspect, a method of soldering a functionalized metal oxide includes forming nanostructures on a substrate; dipping the substrate on which the nanostructures are formed in a precursor solution for hydrothermal synthesis; and irradiating the nanostructures with a pulsed laser to form a solder bump.

Further, in the present invention, two or more nanostructures are formed on the substrate, and any one of the two or more nanostructures are irradiated with a pulsed laser to produce and grow a solder bump, so that the two or more nanostructures may be connected to each other by the grown solder bump. That is, the method may include forming two or more nanostructures on a substrate; dipping the substrate on which the nanostructures are formed in a precursor solution for hydrothermal synthesis; and irradiating any one of the nanostructures with a pulsed laser to grow a solder structure (solder bump), so that the two or more nanostructures are connected to each other.

The nanostructures may have a light absorption layer for absorbing light energy of the laser, formed on at least a portion thereof.

The precursor solution for hydrothermal synthesis may be a mixed solution of an aqueous precursor solution and an aqueous amine compound solution.

The aqueous precursor solution may include any one of metal precursors and semiconductor precursors.

The amine compound may be one or more selected from the group consisting of hexamethyleneamine, hexamethylenetetramine (HMT), cyclohexylamine, monoethanolamine, diethanolamine, and triethanolamine.

As the light absorption layer, different materials may be used depending on a wavelength of the laser.

The light absorption layer may be one selected from the group consisting of metals and semiconductors.

The method may further include annealing the solder structure, after the forming of the solder structure.

The pulsed laser may have a pulse duty ratio of 5% to 20%.

The pulsed laser may have a pulse width controlled in a range of 100 ns to 3000 ns.

The pulsed laser may preferably have peak power in a range of 5 mW/$\mu$m$^2$ to 20 mW/$\mu$m$^2$, in case where an oxide film having a thickness of 50 nm, and a tungsten absorption layer having a thickness of 40 nm are deposited on a silicon substrate under a normal pressure.

The method may further include covering the substrate with a transparent substrate, after the dipping of the substrate on which the nanostructures are formed in a precursor solution for hydrothermal synthesis.

In another general aspect, an electronic device is manufactured by the method as described above.

The electronic device may include a gas sensor, a solar battery, a transistor, a light emitting diode, a biosensor, an optical sensor, or a photodetector.

Other features and aspects will be apparent from the following detailed description, the drawings, and the claims.

DETAILED DESCRIPTION OF MAIN ELEMENTS

Figure 1:
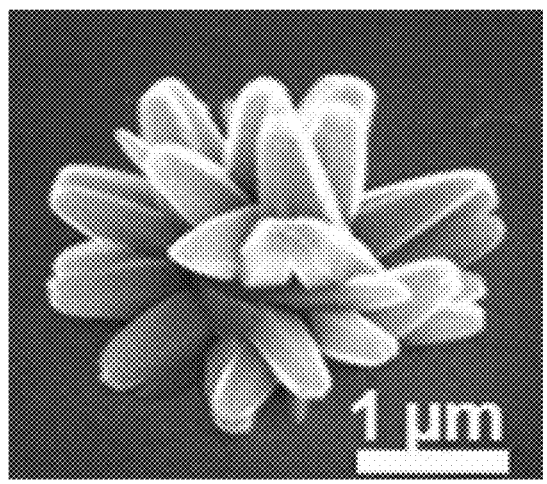
FIG. 1 is a photograph illustrating metal oxide nanostructures produced by a hydrothermal synthesis method by a continuous laser of the prior art.

10: Substrate
20: Nanostructure
30: Light absorption layer
40: Precursor solution for hydrothermal synthesis
50: Functionalized metal oxide solder structure (solder bump)
60: Pulsed laser

DETAILED DESCRIPTION OF EMBODIMENTS

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art. The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, the method of soldering a functionalized metal oxide according to the present invention, and the electronic device manufactured thereby will be described in detail with reference to the accompanying drawings. Herein, the constitution and the operation of the present invention shown in the drawings, and described thereby are described as at least one Example, and the technical idea and the core constitution and operation of the present invention are not limited thereby.

The terms used herein are selected as general terms which are possibly currently widely used considering their functions in the present invention, but they may be different depending on the intention of a person skilled in the art, a convention, the emergence of new technology, or the like. Further, in a certain case, there may be an optionally selected term by the applicant, and in this case, its meaning will be specifically described in the detailed description of the invention. Accordingly, it is noted that the terms used in the present invention should be defined, based on the meaning of the term, and the overall description of the present invention, not the simple designation of the term.

The present invention provides a method of soldering a functionalized metal oxide including forming nanostructures on a substrate; dipping the substrate on which the nanostructures are formed in a precursor solution for hydrothermal synthesis; and irradiating the nanostructures with a pulsed laser to form a solder bump.

Further, there is provided a method of soldering a functionalized metal oxide including forming two or more nanostructures on a substrate; dipping the substrate on which the nanostructures are formed in a precursor solution for hydrothermal synthesis; and irradiating any one of the nanostructures with a pulsed laser to grow a solder structure (solder bump), so that the two or more nanostructures are connected to each other.

Hereinafter, the method of soldering a functionalized metal oxide according to an exemplary embodiment will be described in detail with reference to the accompanying drawings.

Figure 2:
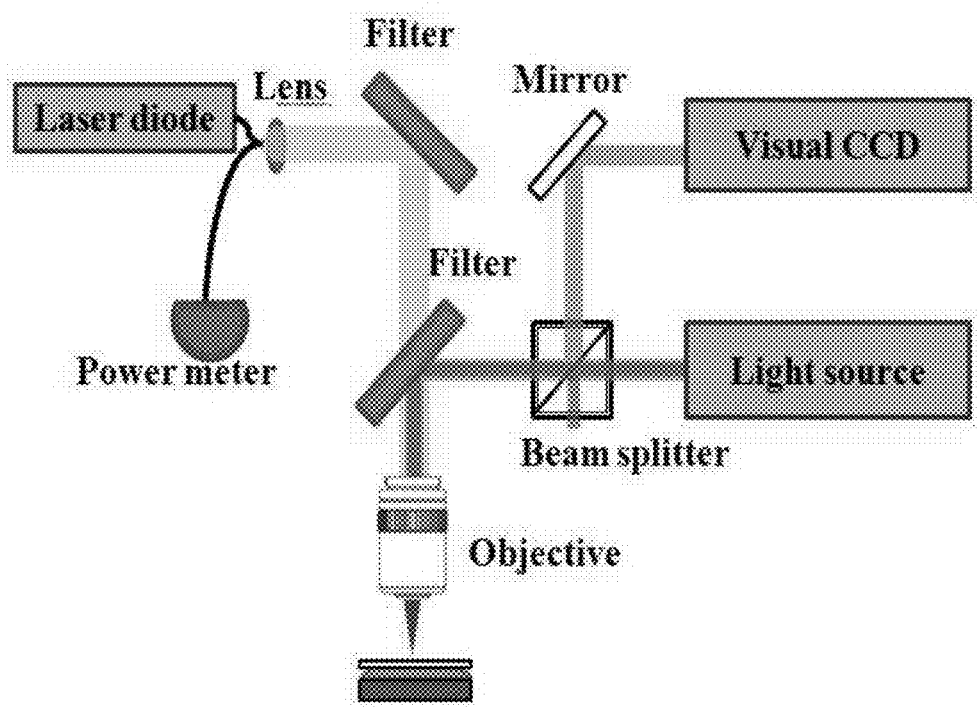
FIG. 2 is a drawing illustrating a laser lithography apparatus for carrying out the method of soldering a functionalized metal oxide according to an exemplary embodiment.

In order to carry out the method of soldering a functionalized metal oxide according to the present invention, a laser lithography apparatus may be used, as shown in FIG. 2. The laser lithography apparatus is the apparatus capable of generating a pulsed laser, and configured to set laser power, irradiating time, a pulse width, and a focusing range. The nanostructures on a substrate may be irradiated with the pulsed laser generated in the laser lithography apparatus.

Figure 3:
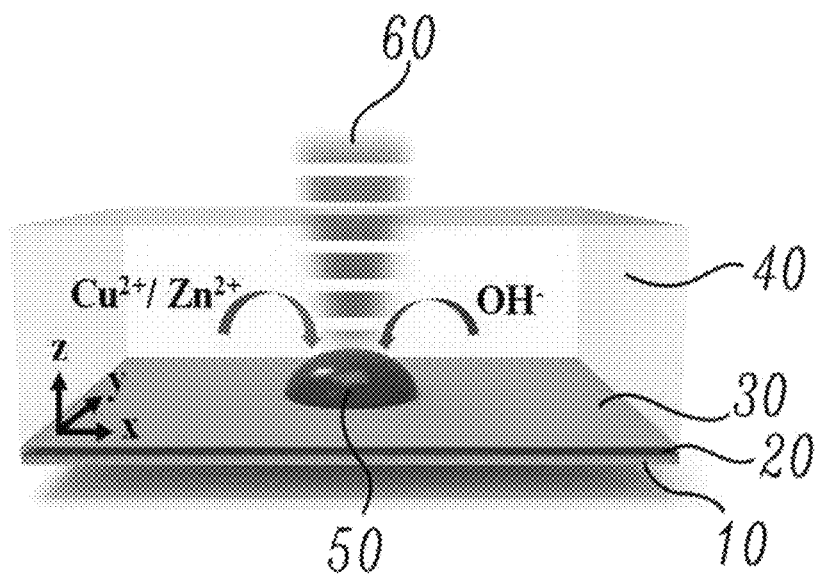
FIG. 3 is a drawing illustrating a principle of the method of soldering a functionalized metal oxide according to an exemplary embodiment.

FIG. 3 is a drawing illustrating a principle of the method of soldering a functionalized metal oxide according to an exemplary embodiment.

Referring to FIG. 3, a substrate 10, nanostructures 20, a light absorption layer 30, and a precursor solution for hydrothermal synthesis 40 are formed sequentially in this order, and a functionalized metal oxide solder bump 50 (solder structure) may be prepared by irradiating a surface of the nanostructures dipped in the precursor solution for hydrothermal synthesis 40 with a pulsed laser 60. Herein, the pulsed laser 60 may cause a hydrothermal synthesis reaction of the precursor solution for hydrothermal synthesis.

In the method of soldering a functionalized metal oxide according to the present invention, when the precursor solution for hydrothermal synthesis received thermal energy through laser irradiation, an amine compound reacts with a water molecule contained in an aqueous solution to generate ammonia, and the ammonia reacts with the water molecule to form an ammonium ion and a hydroxyl ion. The hydroxyl ion may react with a metal or a semiconductor ion contained in a metal precursor or a semiconductor precursor solution to prepare a metal oxide or a semiconductor oxide, but this is not necessarily followed.

In the method of soldering a functionalized metal oxide according to the present invention, the metal precursor contained in the precursor solution for hydrothermal synthesis may be a zinc precursor, and it is preferred that the zinc precursor is one or more compounds selected from the group consisting of zinc chloride ($ZnCl_2$), zinc sulfate ($ZnSO_4$), zinc acetate ($Zn(CH_3CO_2)_2$), zinc citrate ($Zn_3[O_2CCH_2C(OH)(CO_2)CH_2CO_2]_2$), zinc nitrate ($Zn(NO_3)_2$), zinc nitrate hexahydrate ($Zn(NO_3)_2.6H_2O$), and zinc acetate dihydrate ($Zn(OOCCH_3)_2.2H_2O$), which are used for supplying zinc ions in the hydrothermal synthesis.

Further, the metal precursor contained in the precursor solution for hydrothermal synthesis may be a copper precursor, and it is preferred that the copper precursor is one or more compounds selected from the group consisting of copper sulfate ($CuSO_4$), copper(I) chloride (CuCl), copper (II) chloride ($CuCl_2$), copper nitrate ($Cu(NO_3)_2$), copper acetate ($CH_3COOCu$), copper carbonate ($CuCO_3$), copper cyanide ($Cu(CN)_2$), and copper iodide (CuI), which are used for supplying copper ions in the hydrothermal synthesis.

Though the copper precursor or the zinc precursor may be used as above, the present invention is not necessarily limited thereto, and all kinds of metal precursors or semiconductor precursors may be used, as well as the copper precursor or the zinc precursor.

In the method of soldering a functionalized metal oxide according to the present invention, it is preferred that the amine compound may be one or more selected from the group consisting of hexamethyleneamine (HMA), hexamethylenetetramine (HMTA), cyclohexylamine, monoethanolamine, diethanolamine, and triethanolamine, which are used for supplying hydroxyl ions in the hydrothermal synthesis.

In the method of soldering a functionalized metal oxide according to the present invention, it is preferred to further include covering the substrate with a transparent substrate, after dipping the substrate on which the nanostructures are formed in the precursor solution for hydrothermal synthesis. This may be carried out for preventing the applied precursor solution for hydrothermal synthesis from evaporating.

In the method of soldering a functionalized metal oxide according to the present invention, it is preferred to further include depositing one selected from the group consisting of gold, platinum, silver, copper, aluminum, tin, nickel, chromium, cobalt, tungsten, iron, and semiconductors on at least a portion of the nanostructures, before connecting the two or more nanostructures to each other, by irradiating any one of the nanostructures with a pulsed laser to grow a solder structure (solder bump). This is the step for coating a material for absorbing the laser before forming nanostructures on a substrate, and coating the material on the substrate is advantageous in obtaining sufficient temperature for growing metal oxide solder with small laser power. The light absorption layer may be formed differently depending on the wavelength of the laser, thereby increasing light absorption efficiency. As the light absorption layer, semiconductors as well as metals may be used, and also any materials having many free electrons may be used.

In the method of soldering a functionalized metal oxide according to the present invention, annealing the solder structure (solder bump) may be further carried out, after forming the solder structure (solder bump). This may be a treatment method for heating materials to the temperature enough to diffuse them, then slowly cooling them to be in a stable state as it is shown in an equilibrium state. In case of the materials representing change of state with change of temperature, they may be slowly cooled down for sufficient time, to be in a stable equilibrium state shown in a phase diagram, thereby growing the solder structure (solder bump) having better quality.

In the method of soldering a functionalized metal oxide according to the present invention, the pulsed laser may be irradiated at a pulse duty ratio of 5% to 20%, and a pulse width controlled in a range of 100 ns to 3000 ns. The pulse duty ratio is a ratio of the time for laser irradiation in one cycle. If the pulse ratio is less than 5%, the time for laser irradiation will be too short so that sufficient energy for hydrothermal synthesis is not applied, which causes the growth of the solder structure (solder bump) to be too slow. If the pulse ratio is above 20%, the time for cooling will be too short so that the solder structure (solder bump) has lower density, and the shape of the solder structure (solder bump) will not be precisely adjusted, while the precursor solution for hydrothermal synthesis will be heated to above its boiling point, thereby generating bubbles therein which causes lower density, and difficulty in precisely adjusting the shape of the nanostructures.

Figure 4:
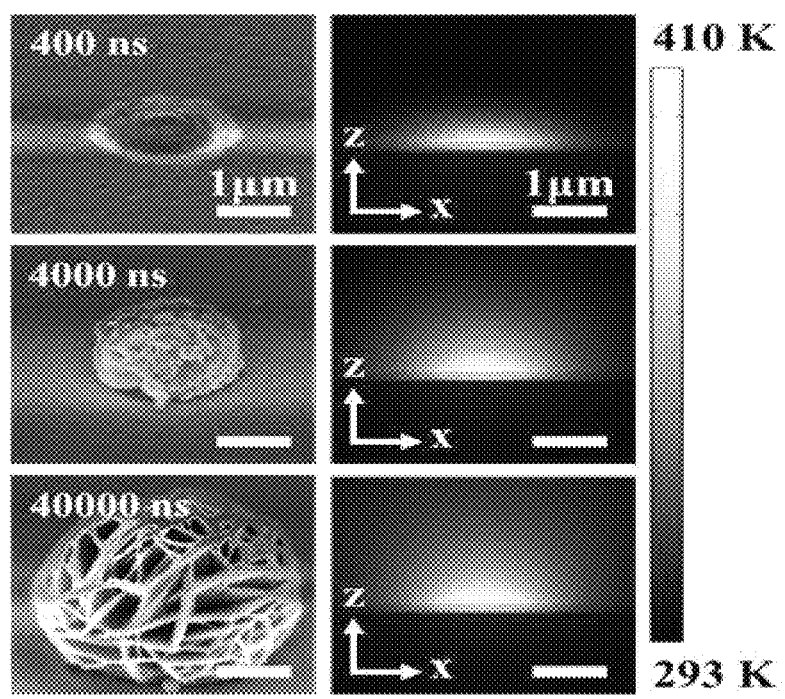
FIG. 4 is a drawing illustrating nanosolder produced according to a pulse width of the method of soldering a functionalized metal oxide according to an exemplary embodiment, and a simulation result.

The pulse width is the time for laser irradiation in one cycle. If the laser is irradiated with the pulse width of less than 100 ns, the time for laser irradiation will be too short so that sufficient energy for hydrothermal synthesis is not applied, which causes the growth of the solder structure (solder bump) to be too slow. If the pulse width is above 3000 ns, the precursor solution for hydrothermal synthesis will be heated to above its boiling point, thereby generating bubbles therein, which causes lower density, and it will be difficult to precisely adjust the shape of the solder structure (solder bump). Referring to FIG. 4, if the pulse width is 400 ns, it was observed that growing was well done. However, if the pulse width is 4000 ns or 40000 ns, it is appreciated that there are generated a number of spaces within the solder structure (solder bump), thereby forming the solder structure (solder bump) having lower density.

Figure 5:
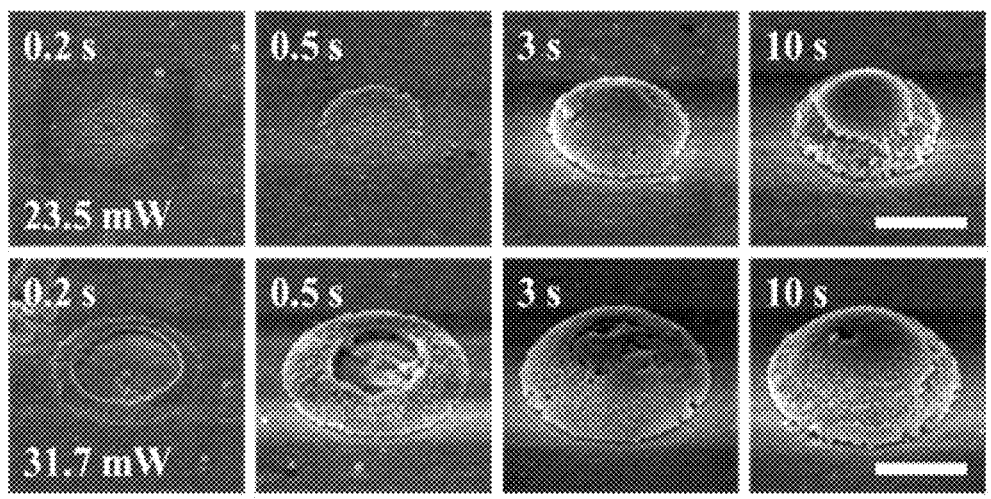
FIG. 5 is a photograph illustrating zinc oxide solder prepared by the method of soldering a functionalized metal oxide according to an exemplary embodiment.

Further, in the present invention, the pulsed laser may preferably have peak power in a range of 5 mW/$\mu m^2$ to 20 mW/$\mu m^2$, in case where an oxide film having a thickness of 50 nm, and a tungsten absorption layer having a thickness of 40 nm are deposited on a silicon substrate under a normal pressure. FIG. 5 is a photograph illustrating zinc oxide solder prepared by the method of soldering a functionalized metal oxide according to an exemplary embodiment, and FIG. 6 is a photograph illustrating copper oxide solder prepared by the method of soldering a functionalized metal oxide according to an exemplary embodiment.

Referring to FIG. 5, in case of irradiation with a laser having power at 23.5 mW, and in case of irradiation with a laser having power at 31.7 mW, change of the zinc oxide solder with time was observed. It is appreciated that in case of irradiation with a laser having power at 23.5 mW, the solder grows at a relatively slow rate, but the zinc oxide solder having high density was prepared, and in case of irradiation with a laser having power at 31.7 mW, zinc oxide solder in a crater shape was initially formed, but after some time passed, the crater part was filled, so that the zinc oxide solder having a relatively large diameter and high density was prepared.

Figure 6:
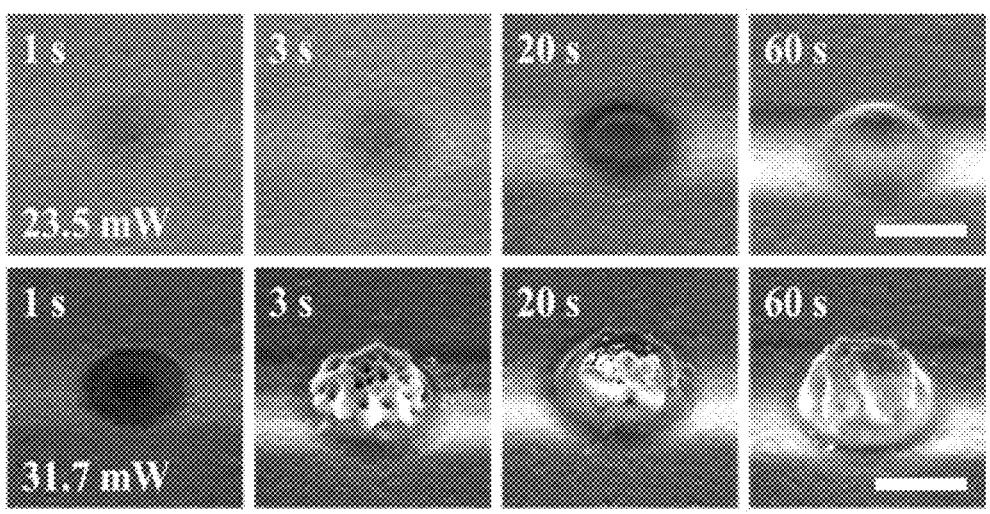
FIG. 6 is a photograph illustrating copper oxide solder prepared by the method of soldering a functionalized metal oxide according to an exemplary embodiment.

Further, referring to FIG. 6, in case of irradiation with a laser having power at 23.5 mW, and in case of irradiation with a laser having power at 31.7 mW, change of the copper oxide solder with time was observed. It is appreciated that in case of irradiation with a laser having power at 23.5 mW, the solder grows at a relatively slow rate, but the copper oxide solder having high density was formed, and in case of irradiation with a laser having power at 31.7 mW, the solder grows at a relatively fast rate, but had rather low density.

Figure 7:
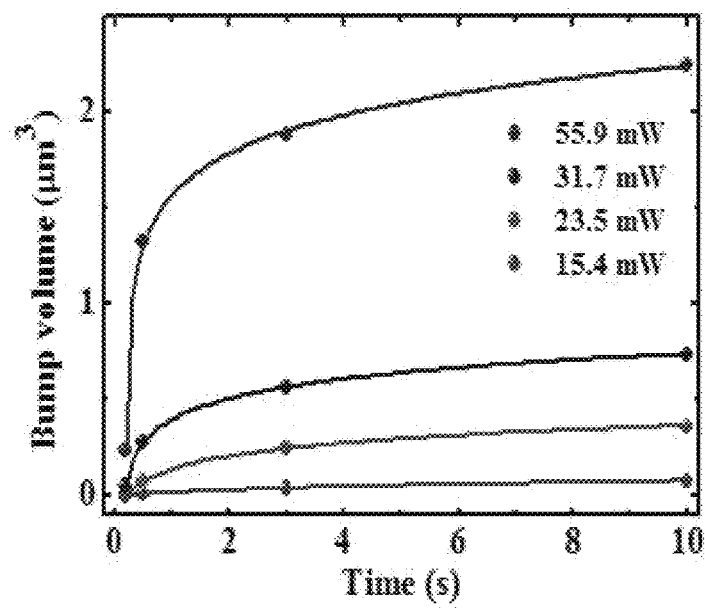
FIG. 7 is a graph illustrating volume of metal oxide solder depending on laser power and irradiating time of the method of soldering a functionalized metal oxide according to an exemplary embodiment.

FIG. 7 is a graph illustrating volume of metal oxide solder depending on laser power and irradiating time of the method of soldering a functionalized metal oxide according to an exemplary embodiment.

Referring to FIG. 7, in case of a laser having power at 15.4 mW, the metal oxide solder grows at a rate too slow, so that the time required for the preparation process is increased, and in case of a laser having power at 55.9 mW, the metal oxide solder grows at a fast rate, but the prepared metal oxide solder has low density. Thus, the power of the laser may be controlled in a range of 15.4 mW to 55.9 mW, more preferably in a range of 20 mW to 40 mW.

Figure 8:
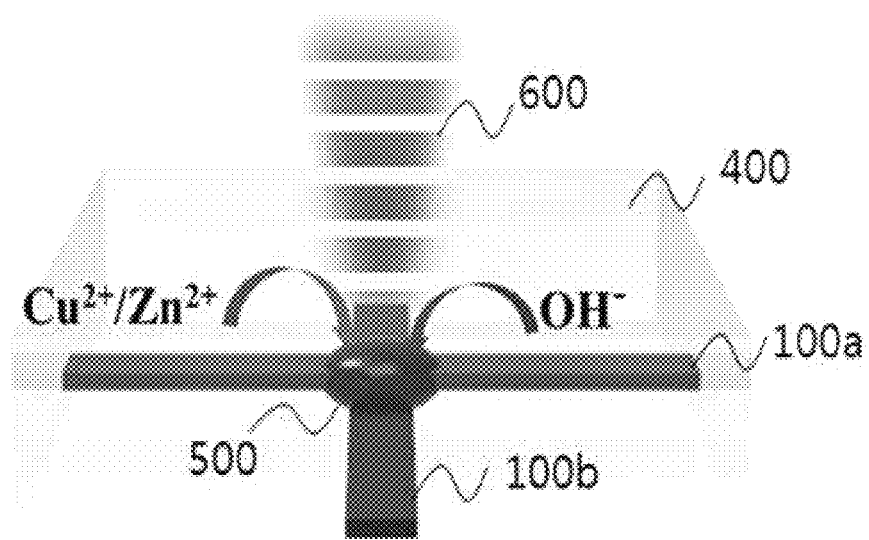
FIG. 8 is a drawing illustrating a principle of functionalized metal oxide solder formed by the method of soldering a functionalized metal oxide according to an exemplary embodiment.

FIG. 8 is a drawing illustrating a principle of functionalized metal oxide solder formed by the method of soldering a functionalized metal oxide according to an exemplary embodiment.

Referring to FIG. 8, two nanostructures 100*a* and 100*b* are formed to be crossed to each other, and the nanostructures 100*a* and 100*b* are dipped in a precursor solution for hydrothermal synthesis. At least a portion of the intersecting points of the nanostructures 100*a* and 100*b* was irradiated with a pulsed laser 600 to grow a metal oxide solder structure 500. The metal oxide solder structure 500 may connect the two nanostructures 100*a* and 100*b* to each other by growing.

Figure 9:
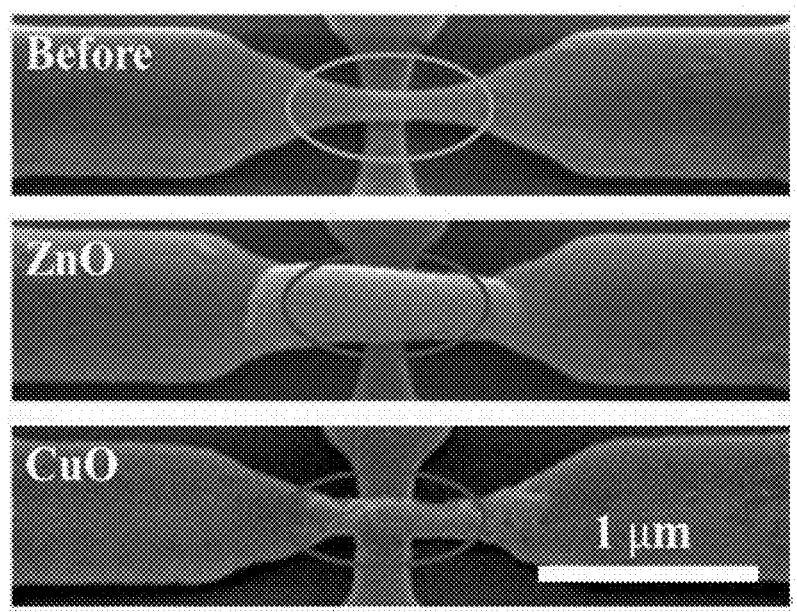
FIG. 9 is a photograph illustrating functionalized metal oxide solder prepared by the method of soldering a functionalized metal oxide according to an exemplary embodiment.

FIG. 9 is a photograph illustrating functionalized metal oxide solder prepared by the method of soldering a functionalized metal oxide according to an exemplary embodiment.

Figure 10:
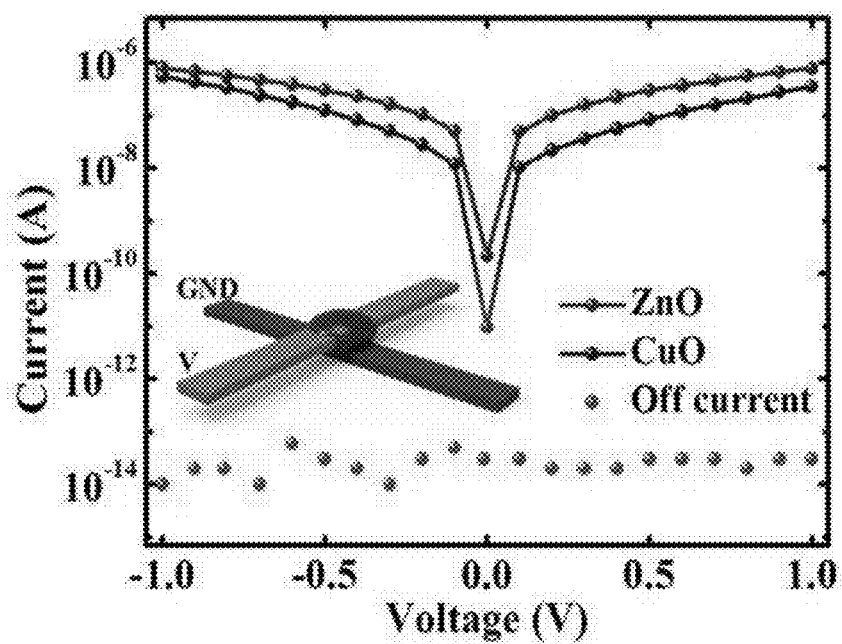
FIG. 10 is a graph representing electrical properties of functionalized metal oxide solder prepared by the method of soldering a functionalized metal oxide according to an exemplary embodiment.

Referring to FIG. 9, two nanostructures spaced from each other are formed to be crossed to each other. Herein, the intersecting point of the nanostructures is irradiated with a pulsed laser to grow a metal oxide solder structure, and accordingly, two nanostructures spaced from each other are soldered. As in FIG. 9, it is appreciated that copper oxide solder and zinc oxide solder grow on two nanostructures spaced from each other, thereby connecting the two nanostructures spaced from each other to each other. FIG. 10 is a graph representing the result of measuring current depending on voltage by grounding a lower nanostructure of the two nanostructures, and applying voltage to an upper nanostructure. In can be seen from FIG. 10 that as voltage is increased, current is increased in proportion, and thus, the two nanostructures are electrically joined.

Figure 11:
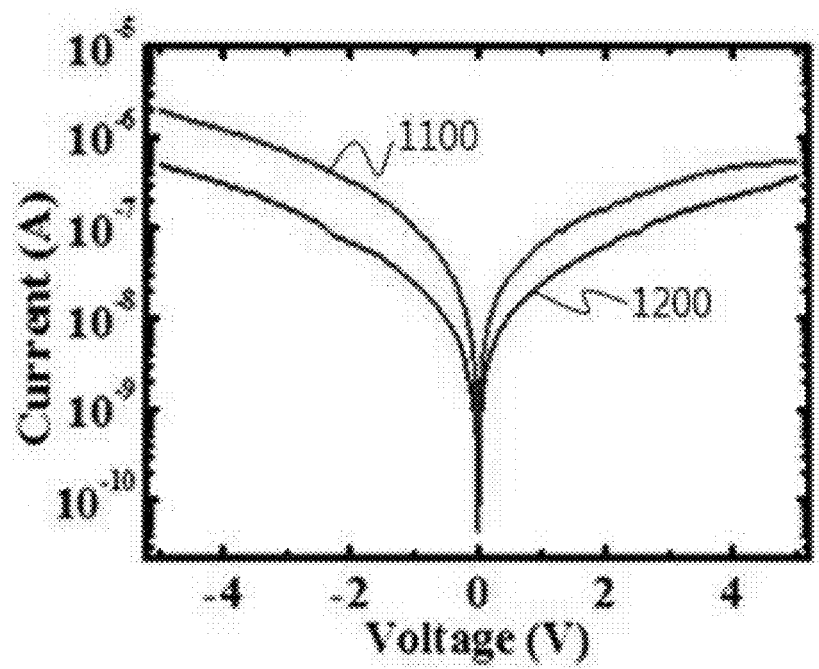
FIG. 11 is a graph representing characteristics of functionalized metal oxide solder prepared by the method of soldering a functionalized metal oxide according to an exemplary embodiment, depending on an annealing step.

FIG. 11 is a graph representing the case of annealing the functionalized metal oxide solder structure prepared by the method of soldering a functionalized metal oxide according to an exemplary embodiment 1100, and the case without annealing 1200. Referring to FIG. 11, it is appreciated that electrical conductivity is further improved by annealing the functionalized metal oxide solder prepared by the method of soldering a functionalized metal oxide according to an exemplary embodiment.

Further, there is provided an electronic device manufactured by a method including forming two or more nanostructures on a substrate; dipping the substrate on which the nanostructures are formed in a precursor solution for hydrothermal synthesis; and irradiating any one of the nanostructures with a pulsed laser to grow a solder structure (solder bump), so that the two or more nanostructures are connected to each other.

Figure 12:
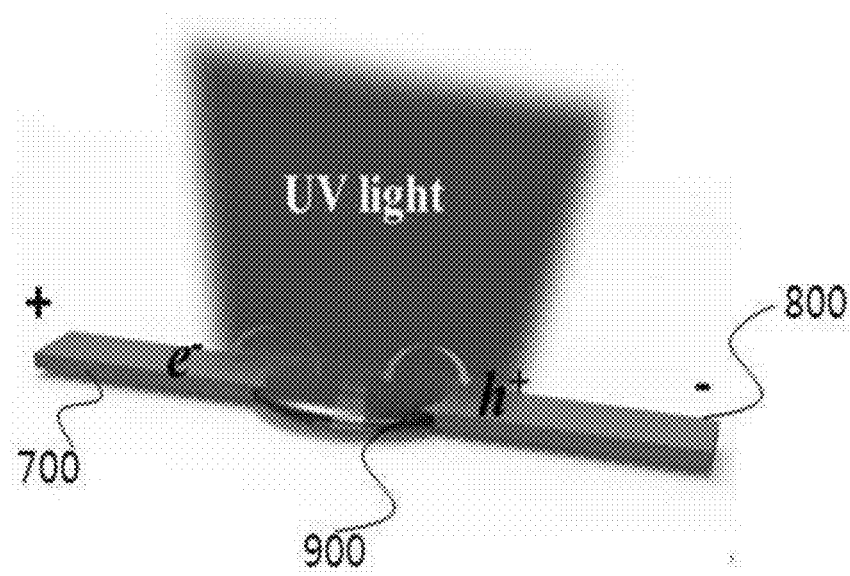
FIG. 12 is a drawing illustrating an ultraviolet sensor manufactured by the method of soldering a functionalized metal oxide according to an exemplary embodiment.

FIG. 12 is a drawing illustrating a principle of an ultraviolet sensor manufactured by the method of soldering a functionalized metal oxide according to an exemplary embodiment. The ultraviolet sensor manufactured by the method of soldering a functionalized metal oxide has electrical conductivity varying with ultraviolet dosage, and is illustrated in FIG. 13.

Figure 13:
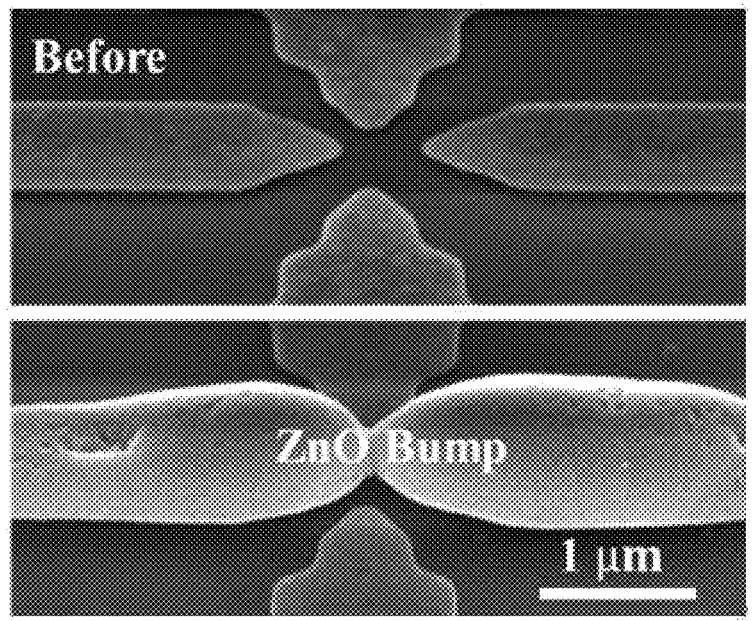
FIG. 13 is a photograph illustrating an ultraviolet sensor manufactured by the method of soldering a functionalized metal oxide according to an exemplary embodiment.

Referring to FIGS. 12 and 13, the ultraviolet sensor manufactured by the method of soldering a functionalized metal oxide according to an exemplary embodiment may have a functionalized metal oxide solder 900 formed between two electrodes 700 and 800. The functionalized metal oxide solder 900 is a metal oxide having electrical conductivity varying with ultraviolet intensity, and the ultraviolet intensity with which the functionalized metal oxide solder 900 is irradiated may be determined by measuring change in the electrical conductivity.

Figure 14:
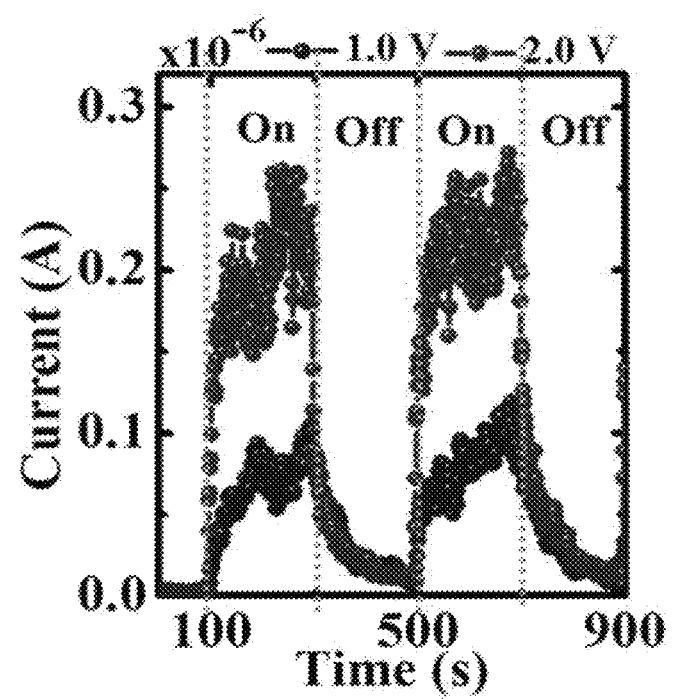
FIG. 14 is a graph illustrating operation characteristics of an ultraviolet sensor manufactured by the method of soldering a functionalized metal oxide according to an exemplary embodiment.
Figure 15:
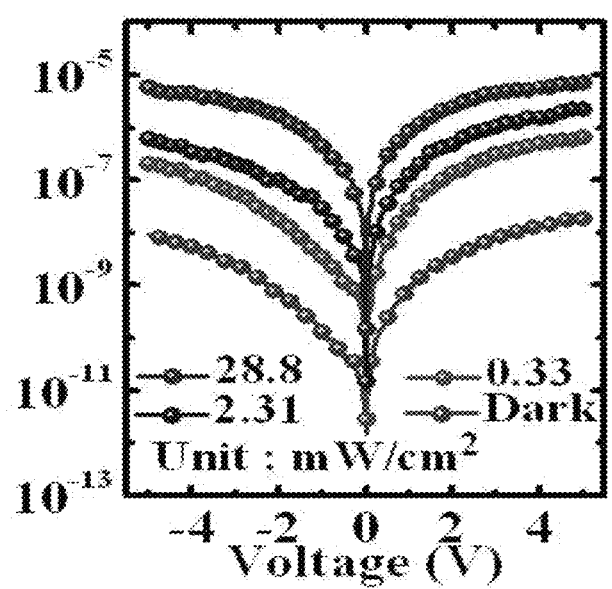
FIG. 15 is a graph illustrating characteristics of an ultraviolet sensor manufactured by the method of soldering a functionalized metal oxide according to an exemplary embodiment, depending on an ultraviolet dosage.

Referring to FIG. 14, in the ultraviolet sensor manufactured by the method of soldering a functionalized metal oxide according to an exemplary embodiment, current increase was confirmed in case of ultraviolet irradiation, and it can be seen whether there is ultraviolet irradiation by sensing such current change. Further, FIG. 15 illustrates the characteristics of the ultraviolet sensor manufactured by the method of soldering a functionalized metal oxide according to an exemplary embodiment, depending on the ultraviolet irradiation intensity, according to the correlation between voltage and current. It is appreciated that the electrical conductivity is low without ultraviolet irradiation, and as the ultraviolet intensity is increased to 0.33 mW/cm$^2$, 2.31 mW/cm$^2$ and 28.8 mW/cm$^2$, the electrical conductivity of the ultraviolet sensor is increased.

As described above, it is confirmed that metal oxide solder structure or semiconductor solder structure may be grown by the method of soldering a functionalized metal oxide according to an exemplary embodiment. This method is to irradiate the surface of nanostructures with a pulsed laser to heat the surface of the nanostructures, and to grow the metal oxide solder structure or semiconductor solder structure by a hydrothermal synthesis reaction between the heated nanostructures and a precursor solution for hydrothermal synthesis. In case where the laser is a continuous laser, thermal diffusion may excessively occur on the surface of the nanostructures so that the growing solder structure is difficult to be controlled, the uprightness of the solder structure may be lowered due to excessive heat, and the density of the solder structure may be lowered or the nanostructure may be broken due to bubbles generated in the precursor solution by heat. If the laser is a pulsed laser, the solder structure may grow locally on the surface of the nanostructures, and is possible to grow only on a desired area at a rapid rate.

According to the present invention, thermal diffusion generated from a laser is limited due to the use of a pulsed laser, and thus, nanosolder having high density and a shape that may be precisely adjustable may be prepared by a hydrothermal synthesis method by the pulsed laser, and it may be grown to facilitate the joining of the nanostructures, and further, formed between the nanostructures thereby being used as a metal oxide structure having functionality.

What is claimed is:

1. A method of soldering a functionalized metal oxide comprising:
    forming two nanostructures on a substrate, wherein the two nanostructures are crossed with respect to one another to form an intersection point;
    dipping the substrate on which the nanostructures are formed in a precursor solution for hydrothermal synthesis; and
    irradiating at least a portion of the intersection point of the two nanostructures in a precursor solution for hydrothermal synthesis with a pulsed laser having a pulse duty ratio of 5% to 20% and a pulse width controlled in a range of 100 ns to 3000 ns to produce and grow a solder bump, so that the two nanostructures are connected to each other by the grown solder bump.

2. The method of claim 1, wherein the nanostructures have a light absorption layer for absorbing light energy of the laser, formed on at least a portion thereof.

3. The method of claim 2, wherein as the light absorption layer, different materials are used depending on a wavelength of the laser.

4. The method of claim 2, wherein the light absorption layer is one selected from the group consisting of metals and semiconductors.

5. The method of claim 1, wherein the precursor solution for hydrothermal synthesis is a mixed solution of an aqueous precursor solution and an aqueous amine compound solution.

6. The method of claim 5, wherein the aqueous precursor solution includes any one of metal precursors and semiconductor precursors.

7. The method of claim 5, wherein the amine compound is one or more selected from the group consisting of hexamethyleneamine, hexamethylenetetramine (HMT), cyclohexylamine, monoethanolamine, diethanolamine, and triethanolamine.

8. The method of claim 1, further comprising annealing the solder bump, after the forming of the solder bump.

9. The method of claim 1, wherein the substrate comprises a silicon substrate on which an oxide film having a thickness of 50 nm and a tungsten absorption layer having a thickness of 40 nm are deposited, and the pulsed laser has a peak power irradiated in a range of 5 mW/μm$^2$ to 20 mW/μm$^2$ in atmospheric pressure.

10. The method of claim 1, further comprising covering the substrate with a transparent substrate, after the dipping of the substrate on which the nanostructures are formed in a precursor solution for hydrothermal synthesis.

* * * * *